United States Patent [19]

Tocker

[11] 3,907,795
[45] Sept. 23, 1975

[54] 3-(TETRAHYDRO-2-PYRANYL)-1,3,5-TRIAZINEDIONES AND THEIR USE AS HERBICIDES

[75] Inventor: Stanley Tocker, Wilmington, Del.

[73] Assignee: E. I. Du Pont de Nemours and Company, Wilmington, Del.

[22] Filed: May 24, 1974

[21] Appl. No.: 473,226

[52] U.S. Cl. .............. 260/249.5; 71/93; 260/465.4; 260/482 C; 260/345.7
[51] Int. Cl.² ....................................... C07D 251/10
[58] Field of Search ................................. 260/249.5

[56] References Cited
FOREIGN PATENTS OR APPLICATIONS
2,254,200  5/1974  Germany
783,916    5/1972  Belgium
764,676    3/1971  Belgium

*Primary Examiner*—John M. Ford

[57] ABSTRACT

Herbicidal 3-pyranyl-1,3,5-triazinediones of the formula:

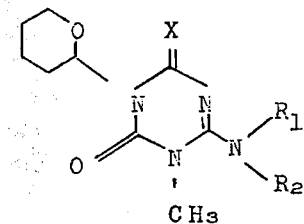

wherein
 X is oxygen or sulfur;
 $R_1$ is hydrogen or methyl; and
 $R_2$ is methyl.

Exemplary of such compounds is:
 1-methyl-6-dimethylamino-3-(tetrahydro-2-pyranyl)-s-triazine-2,4-(1H,3H)dione.

3 Claims, No Drawings

3-(TETRAHYDRO-2-PYRANYL)-1,3,5-TRIAZINEDIONES AND THEIR USE AS HERBICIDES

BACKGROUND OF THE INVENTION

Johnson, "Pesticides' 72", *Chemical Week*, June 21 and July 26, 1972, list several commercial and experimental s-triazine herbicides. Among these are atrazine, simazine, prometone, and prometryne:

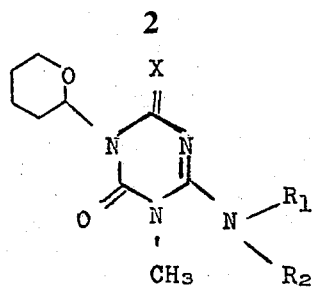

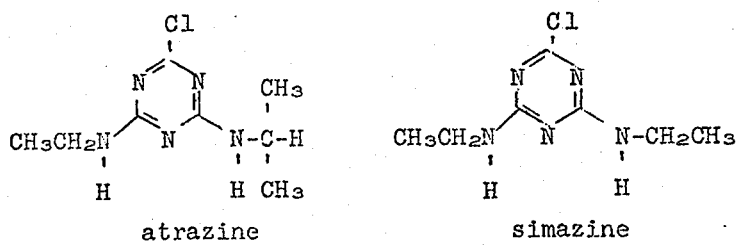

atrazine    simazine

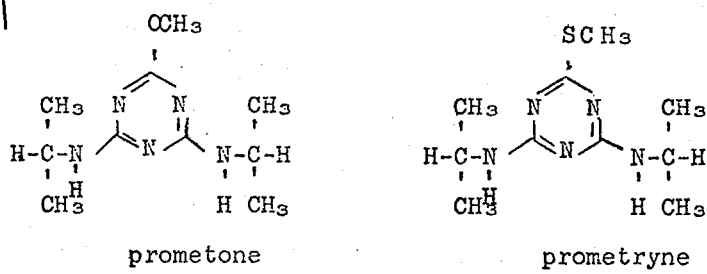

prometone    prometryne

Copending U.S. patent application Ser. No. 348,321, filed Apr. 5, 1973, now abandoned, by Kang Lin (which is a continuation-in-part of U.S. Patent application Ser. No. 256,249, filed May 24, 1972, now abandoned) discloses a class of s-triazines of the general formula:

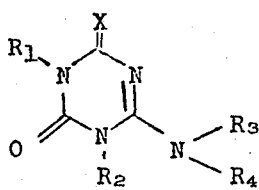

where X is oxygen or sulfur
$R_1$ is certain organic radicals, including certain open chain and cyclic radicals, but not including any heterocyclic radicals.
$R_2$ is hydrogen, lower alkyl or certain cations
$R_3$ is hydrogen or certain lower alkyls and
$R_4$ is certain organic radicals.
These compounds are disclosed as being useful as herbicides.

The compounds of the present invention result from efforts to develop new herbicidal compounds.

SUMMARY OF THE INVENTION

This invention relates to novel compounds of the following formula and their use as herbicides:

wherein
X is oxygen or sulfur;
$R_1$ is hydrogen or methyl; and
$R_2$ is methyl.

This invention also includes herbicidal compositions containing the above compounds as active ingredient and methods of controlling undesirable vegetation by applying the compounds and/or compositions.

DESCRIPTION OF THE INVENTION

Preferred Compounds

Certain of the compounds of Formula I are preferred because of their higher herbicidal activity and ease of synthesis. These include those compounds of Formula I where X is oxygen or sulfur and
$R_1$ and $R_2$ are methyl.

The most preferred compound from within this group is:

1-methyl-6-dimethylamino-3-(tetrahydro-2-pyranyl)-s-triazine-2,4-(1H,3H) dione.

Synthesis of the Compounds

The compounds of Formula I can be made by the processes described and exemplified below:

The first method to be described starts with cyanamide and involves reaction steps 1 through 5 shown below.

(1) 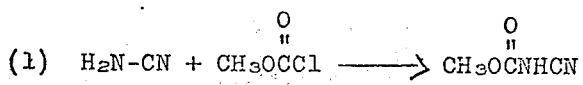

(2) 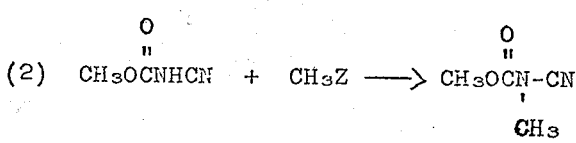

(3) 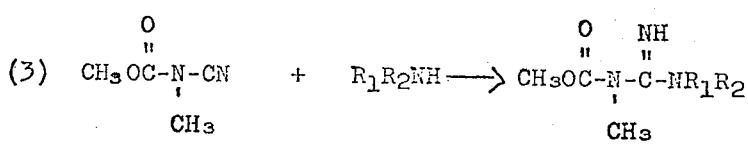

(4) 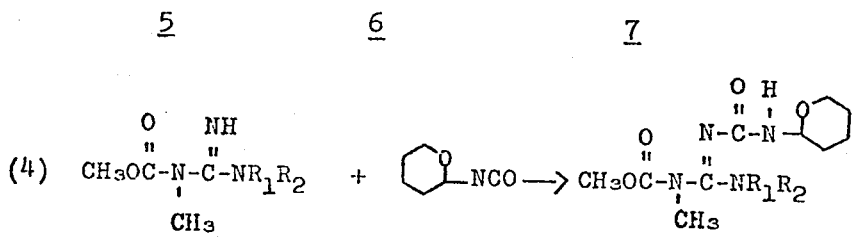

(5) 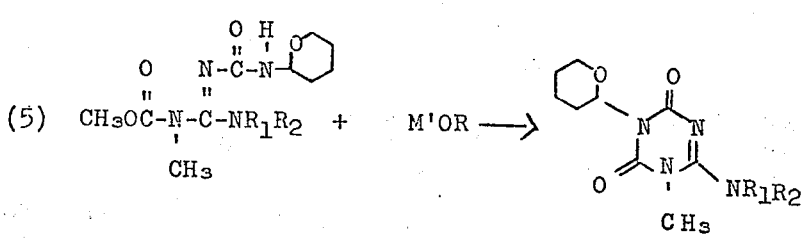

(compound I wherein X is oxygen)

wherein:
R$_1$ and R$_2$ are as previously defined,
R is hydrogen or alkyl of 1 through 4 carbon atoms,
M' is alkali metal, and
Z is iodide or

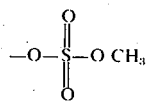

The process of preparation of methyl cyanocarbamate (compound 3 from cyanamide (compound 1) and methyl chloroformate (compound 2) is described in U.S. Pat. No. 3,657,443 (Equation 1).

An aqueous solution of the sodium salt of compound 3, containing from 15 to 35% of 3, preferably 20 to 30%, is reacted at 10° to 70°C., preferably 25° to 45°C., with 0.9 to 1.4, preferably 1.0 to 1.2, molecular equivalents of an alkylating agent 4 (for example, dimethyl sulfate) during a period of 2 to 16 hours, preferably 4 to 8 hours (Equation 2). As the reaction proceeds a second phase of compound 5 forms. After the reaction has proceeded for the desired time the upper layer of compound 5, which contains some water, is separated and the lower aqueous layer is contacted with an organic solvent selected from methylene chloride, dichloroethane, triclene, benzene, toluene and xylene; toluene is preferred. Other dialkyl sulfates (or alkyl halides) can be used instead of dimethyl sulfate, the sulfates being preferred for economic reasons.

The extract and the upper layer are analyzed for compound 5 by gas chromatography and added to an aqueous solution containing 15 to 75%, preferably 25 to 50% of the hydrochloride or sulfate of compound 6, preferably the sulfate (Equation 3). The mole ratio of amine salt to compound 5 can be from 1 to 3, preferably 1.5 to 2.5. The extraction solvent used (e.g., toluene) is removed by either azeotropic or simple distillation, depending on the boiling point. The residual aqueous mixture is then agitated for from 3 to 10 hours at 50° to 110°C., preferably 85° to 95°C. (Equation 3). Higher temperatures require shorter reaction times and vice versa.

The resulting reaction mass contains compound 7 and by-product trisubstituted guanidine as well as unreacted compound 6, all present as salts. Before proceeding with the reaction of compound 7 with compound 8 it is necessary to liberate the free bases and remove the excess compound 6 to prevent the formation of by-product ureas. This operation can be effected by adding 50% aqueous sodium hydroxide equivalent to the amount of compounds 6 and 7 present, as determined by gas chromatographic analyses, and extracting with an organic solvent such as methylene chloride, followed by distilling a portion of the organic solvent to remove excess compound 6, or by removing compound 6 directly from the aqueous solution by distillation or by stripping with an inert gas after first adding base to form the free amine. The latter procedure is preferred. Compound 7 is relatively unstable in aqueous solution when present as the free base and tends to decompose into the corresponding trisubstituted guanidine. The rate of decomposition is directly proportional to pH and temperature. Therefore, when removing excess compound 6 by direct distillation or stripping from water it is advantageous to use a vacuum and to perform the operation as rapidly as possible.

The above described aqueous distillation procedure can be operated batchwise or continuously. It is preferred to carry out the operation in a continuous manner so that the exposure of compound 7 to high temperature and high pH is reduced to a minimum. This is accomplished by adding aqueous alkali metal hydroxide to the product from reaction 3 in a pipe-line reactor or by running the product and the alkali metal hydroxide into a small agitated vessel with a short holdup time, from 0 to 10 minutes, preferably 0 to 2 minutes. If the concentration of amine salt used is such that sodium salt precipitates during this neutralization additional water must be added to maintain this salt in solution. The overflow from this vessel is fed to a distillation column operated under vacuum. The column is heated by feeding steam into the bottom; compound 6 and water are taken off as distillate (overhead) and an aqueous solution of compound 7 and trisubstituted guanidine as bottoms.

The conditions under which the column can be operated are numerous and depend to some extent on the nature of compound 6. However, in general, conditions are selected so that the temperature of the feed to the column is not over 50°C. This necessitates cooling the product from equation 3 to approximately 30°C. before adding the caustic. The column is operated at a pressure of 25 to 300 mm of Hg, preferably 50 to 150 mm and the amount of steam fed to the bottom of the column is adjusted such that the amount of water taken overhead along with compound 6 is equivalent to 5 to 25% of the weight of the reaction mass from equation 3.

The bottoms from the above distillation are fed into a hold tank which is maintained at a pH of 5 to 7 by the continuous addition of either sulfuric or hydrochloric acid; sulfuric is preferred. The concentration of compound 7 in the neutralized solution is maintained at 15 to 50%, preferably 20 to 40%. The concentration will depend upon the strength of the salt solution of compound 6, base and acid solutions employed in the previous steps, and the amount of concentration or dilution which occurred during the distillation. The temperature of this solution is maintained at 25° to 45°C., preferably 25° to 35°, by either cooling the bottoms in a continuous-type cooler before neutralization or by cooling the neutralization vessel itself.

Reaction 4 is performed by preparing a mixture of the above solution and a solvent such as benzene, chlorobenzene, toluene, or xylene; toluene is preferred. The amount of solvent added should be sufficient to dissolve the amount of compound 9 which will be formed. Generally, the amount of solvent used is above 7 to 10 times the amount of compound 7 present in the aqueous solution.

An amount of compound 8 which is stoichiometrically equivalent to 85 to 100%, preferably 92 to 98%, of the compound 7 present in the aqueous layer is now added and with good agitation the addition of 50% aqueous caustic is started while the temperature is maintained at −5° to 50°C., preferably 5° to 35°C. by external cooling. The caustic addition is made as rapidly as heat can be removed to maintain the desired temperature and is continued until an amount stoichiometrically equivalent to the amount of acid used in neutralizing compound 7 has been added. If a solid phase of a sodium salt is now present, sufficient water should be added to dissolve it. The reaction is allowed to continue after the caustic addition is complete until the pH of the aqueous solution is nearly constant. This requires an addition time of 1 to 3 hours. Alternately, compound 8 and the aqueous caustic can be added simultaneously while the pH of the reaction mass is maintained at 9 to 10, preferably 9.3 to 9.7, during 1 to 4 hours, preferably 2 to 3. The aqueous sodium hydroxide addition is then continued until the pH is nearly constant. The agitation is stopped and the layers allowed to separate. The lower aqueous layer is removed and the upper organic layer is evaporated at a pressure of 50 to 760 mm/Hg, preferably 100 to 300 mm/Hg, until a clear distillate is obtained (indicating that all water has been removed).

The residual solution or slurry containing compound 9 is cooled, if necessary, to 25°–45°C., while anhydrous amine 6 (for example, dimethylamine) is added, either as a gas, or a liquid. It is preferred to add the amine 6 at 25°–35°C., but higher or lower temperatures can be used depending on the solubility of amine 6 in the particular solvent. It is important to have at least 1.0 and, preferably, 1.0 to 2.5 moles of amine 6.

Next, the ring closure catalyst (compound 10) is added (Equation 5). The catalyst is an alkali metal alkoxide (or hydroxide) and it may be added either as a dry solid or as a solution in the alkanol. Dry sodium methoxide or a solution of sodium methoxide in methanol is a preferred catalyst. The amount of catalyst needed is from 0.1 to 5.0 mole percent of compound 9. Higher concentrations are not desirable because side reactions begin to intervene. A preferred concentration of compound 10 is from 1.0 to 2.0 mole percent of compound 9. The temperature is not critical and the ring-closure reaction can proceed at temperatures from 0° to 120°C. provided that amine 6 is kept within the reaction system. The reaction is normally exothermic and the solution may be cooled if a lower temperature is required to retain amine 6. It is critical that the amine 6 remain present until ring closure is about complete.

After the catalyst is added, the reaction mass is held for 0.1 to 2.0 hours to insure completion of the ring closure. The reaction is rapid and normally is about complete in less than 1.0 hour.

The amine 6, by-product methanol, and part of the solvent are then removed by distillation, either at atmospheric or reduced pressure. Water is then added and the remainder of the solvent is removed by azeotropic distillation. The overhead water may be discarded or returned to the system, whichever is desirable. The amount of water remaining in the residue is not critical and may range from 0.1 to 5 or more parts per part of compound 11, depending on how compound 11 is to be isolated. Isolation can be by crystallization followed by filtration or centrifugation, by spray-drying, by phase-separation to remove most of the water, or by other conventional methods.

Alternatively, compound 11 can be recovered without distillation of all the methanol, amine 6, and solvent. If a poor solvent for compound 11, such as hexane, is added to the reaction mixture, compound 11 will precipitate and can be recovered by conventional methods.

The following example further illustrates this method for synthesis of compounds of this invention. All parts are by weight and all temperatures in degrees centigrade unless otherwise indicated.

EXAMPLE 1

1-methyl-6-dimethylamino-3-(tetrahydro-2-pyranyl)-s-triazine-2,4(1H,3H)dione

Tetrahydro-2-pyranyl isocyanate (3.2 grams) was added dropwise to a solution of 4.0 grams of N-methoxycarbonyl-N,N',N'-trimethylguanidine in 10 ml. of methylene chloride. The solution was then stirred at room temperature for 4 hours after which the solvent was evaporated in a vacuum oven at 50°C. (0.25 mm/Hg) to give 7.0 grams of the semi-solid product, methyl-N-(N-tetrahydro-2-pyranylcarbamoyl)-N'-dimethylaminocarbamate.

A solution of this carbamate in 60 ml of anhydrous toluene was refluxed while adding dropwise 2.0 ml of 2½% methanolic sodium methoxide over a 40-minute period while methanol was distilled out simultaneously. The toluene solution was then cooled to room temperature, precipitating the crude cyclized product. This product was purified by recrystallization from benzene solution by adding hexane until the point of incipient cloudiness. The material was cooled and then dried in a vacuum oven, giving 5.4 grams of the product, 1-methyl-6-dimethylamino-3-(tetrahydro-2-pyranyl)-s-triazine-2,4(1H,3H) dione, m.p. 170°–172°C.

An alternative method for preparing the compounds of this invention starts with a 2-methyl-2-thiopseudourea salt such as the sulfate or hydrochloride. A schematic representation of this method is shown by equations 6 through 12.

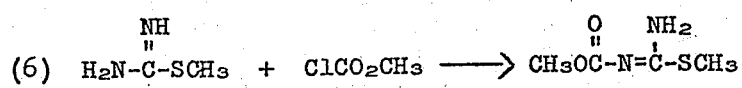

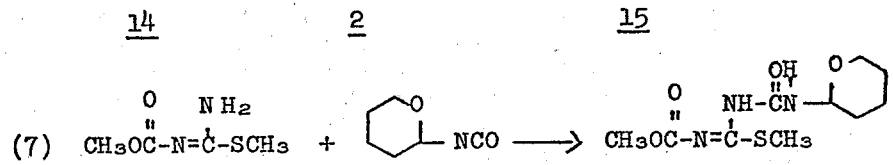

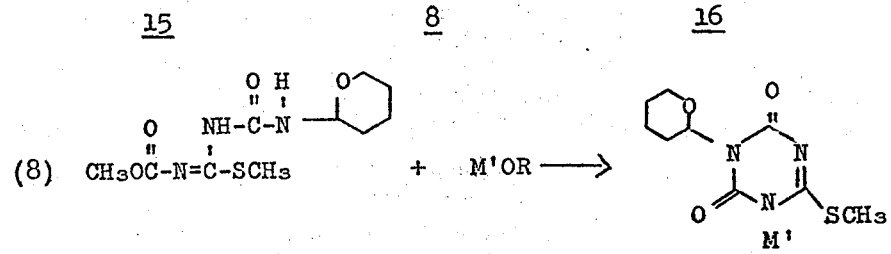

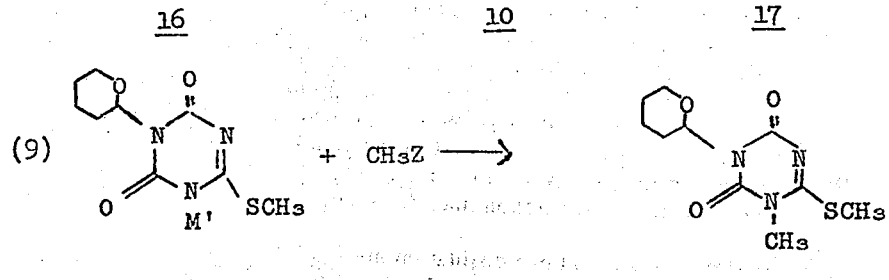

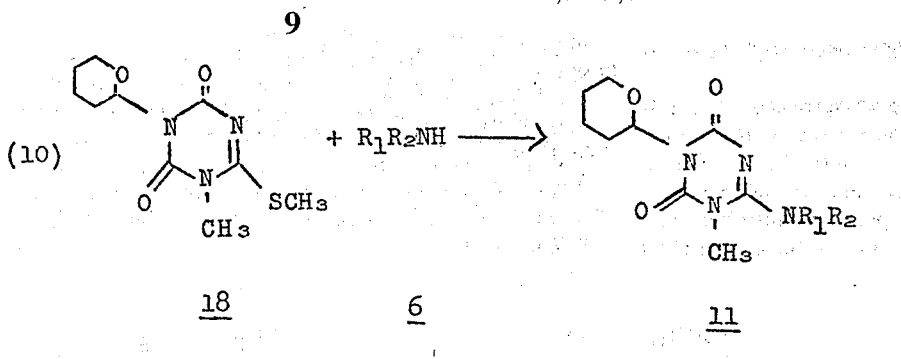

18    6    11 wherein:

$R_1$, $R_2$, R, M′, and Z are as previously defined.

A suspension or solution of compound 14 is made in the selected solvent and treated with methyl chloroformate (Equation 6) until the reaction is complete. The product a 1-carbomethoxy-2-methyl-2-thiopseudourea (compound 15) is treated with an isocyanate of formula $R_1NCO$ (Equation 7) to give compound 16. A solution of compound 16 in a suitable solvent is treated with an alkali metal alkoxide to give the salt 17 (Equation 8). A solution or slurry of compound 17 in a selected solvent is reacted with an alkylating agent to give compound 18 (Equation 9). A suspension or solution of compound 18 in a selected solvent is treated with an amine (6) to give a compound 11. The product, a s-triazine-2,4(1H,3H)dione, can be isolated by conventional techniques as described above in the discussion of Equation 5.

The solvents which can be used in these reactions are water, toluene, benzene, xylenes, monochlorobenzene, nitrobenzene, methylene chloride, triclene, perclene, or mixtures of these organic solvents with water, i.e., the solvent need not be anhydrous.

With the above solvents it is practical to use a ratio of compound 14 to solvent such as 1:3 to 1:10, preferably from 1:3 to 1:6. Most preferred among this group of solvents in view of their lower cost and greater suitability for use in operation of this process are water, toluene, xylene, and benzene.

The most preferred solvent for the conversion in Equation 6 is water. Mixtures of water and the organic solvents listed above can be used. With the above solvents it is practical to use a ratio of water:organic solvent of 1:1 to 1:6, most preferably 1:1 to 1:2.

The ratio of compounds 14:2 can be varied from 1:0.1 to 1:3, preferably from 1:0.8 to 1:2, most preferably 1:1 to 1:1.3.

Reaction 6 can be carried out from −10° to 50°C. but preferably from 0° to 30°C. and most preferably from 0° to 25°C.

The pH in reaction 6 can be varied preferably from 6.5 to 11 and most preferably from 7–8.5.

The order of addition of the methyl chloroformate vs. addition of aqueous base can be varied. The methyl chloroformate can be added first, followed by the aqueous base. But preferred is the simultaneous addition of methyl chloroformate and the aqueous base. The base can be selected from Li, Na, and K hydroxide. The strength of the base to be added can vary from 10–50% but the higher concentration of base is most preferred because of the lower reaction volume for a given amount of product.

This simultaneous addition of methyl chloroformate or isocyanate $R_1NCO$ and 50% aqueous base gives a higher yield of product 15 because of the controlled pH conditions and shorter contact time with water required for completion of reaction.

Reaction 7 is preferably carried out between 0° and 50°C. and most preferably between 15° and 35°C.

The ratio of isocyanate to 15 is preferably 1:1.1 to 1:1.5 and most preferably 1:1.05 to 1:1.15 in the interest of obtaining a high percentage conversion of compound 15 to compound 16 without the use of an unneeded excess of isocyanate or long reaction time.

The reaction time acquired for addition of methyl chloroformate or isocyanate is not critical and may vary from 0.1 to 10 hours, preferably from 0.1 to 4 hours, and most preferably from 0.25 to 1.5 hours.

The compound 16 is preferably treated with 0.6 to 1.3 equivalents of alkali metal alkoxide and most preferably with 0.9 to 1.1 equivalents. The alkoxide can be used as the pure base or preferably as a solution in a suitable solvent and most preferably as a 15 to 35% solution in the corresponding alcohol.

The solution of compound 16 can be cyclized to compound 17 by use of an alkali metal hydroxide but an alcoholic solvent must be added to dissolve the hydroxide before cyclization occurs.

The cyclization of compound 16 to compound 17 (Equation 8) takes place preferably at 25° to 70°C. but most preferably at 45° to 70°C.

The removal of solvent to give a slurry of compound 17 can be carried out under reduced pressure or at atmospheric pressure at a temperature of 20° to 135°C., but most preferably from 25° to 50°C. under reduced pressure and from 65° to 100°C. at atmospheric pressure.

The alkylation of compound 17 (Equation 9) with alkylating agent 4 (Z = halogen, alkylsulfate) can be carried out in a solvent such as water, toluene, benzene, xylene, chlorobenzene, nitrobenzene, acetonitrile, triclene, or perclene.

The preferred solvent is water because of lower cost, simplicity of process operation, and ease of isolation of the product 18. The product in this case can be isolated by filtration and drying or may be used directly as a wet solid in the next reaction by suspension in an organic solvent and removal of water by azeotropic distillation.

In the case where a dialkyl sulfate is used to alkylate compound 17, the pH of the aqueous solution or slurry should be maintained preferably between 7 and 11.5 and most preferably from 9–10.5 to avoid acidification of compound 17, thus preventing alkylation.

The ratio of alkylating agent to compound 17 is preferably 0.8 to 1 to 1.5 to 1 but most preferably 1.1 to 1.3:1. The reaction can be carried out at a temperature from 15° to 135°C. if in an organic solvent and most preferably between 25° and 80°C.

When water is used as a solvent, the preferred temperature range is 15°–80°C. and the most preferred is 25°–40°C.

The conversion of the 6-methylthio-s-triazine-2,4-(1H,3H)dione (compound 18) to the 6-amino-s-triazine-2,4(1H,3H)dione 11 can be preferably carried out in a solvent selected from toluene, xylene, benzene, monochlorobenzene, triclene, perclene, nitrobenzene, methylene chloride, and 1,2-dichloroethane. The most preferred solvent is toluene.

3 ml of 40% aqueous methylamine and stirred for 70 hours. The solvent was removed in a rotary evaporator, giving 1.4 grams of the white, solid product, 1-methyl-3-(tetrahydro-2-pyranyl)-6-methylamino-s-triazine-2,4(1H,3H)-dione, m.p. 189°–190°C.

An alternative method for making those compounds of this invention where X is sulfur is illustrated by Equation 11:

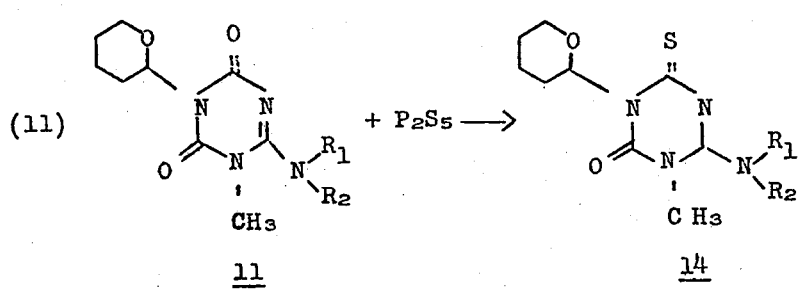

The preferred ratio of compound 18 to the amine is preferably 1:1 to 1:6 and most preferably, because of complete conversion to 11 and shorter reaction time required, 1:2 to 1:3. The amine in selected cases can be used as the solvent.

The conversion of compound 18 to compound 11 can be carried out at temperatures from 5° to 135°C. but most preferably from 25° to 60°C.

The following examples illustrate the methods of Equations 6 through 10.

EXAMPLE 2

1-methyl-3-(tetrahydro-2-pyranyl)-6-methylthio-s-triazine-2,4(1H,3H)dione

Tetrahydro-2-pyranyl isocyanate (22.2 grams) was added dropwise to a solution of 25.85 grams of methyl N-(1-amino-1-methylthiomethylene) carbamate in 200 ml of anhydrous tetrahydrofuran. The solution was refluxed for two hours after which the solvent was removed in a rotary evaporator, thus yielding 42 grams of methyl-4-(tetrahydro-2-pyranyl)-N-methoxycarbonyl-1-thioallophanimidate, m.p. 97°–98°C.

A solution of 37.6 grams of this imidate in 300 ml of anhydrous methanol was treated dropwise, with stirring, with a solution of 7.37 grams of sodium methoxide in 130 ml of methanol. The resulting solution was refluxed one hour. The solvent was removed in a vacuum oven, leaving 42 grams of the white, water-soluble sodium salt of 3-(tetrahydro-2-pyranyl)-6-methylthio-s-triazine-2,4(1H,3H)dione.

This salt was dissolved in 450 ml of acetonitrile and treated with 25 grams of methyl iodide, and the resulting solution was refluxed for 17 hours. The solvent was removed in a rotary evaporator and the solid residue was washed with water and then dried in a vacuum, yielding 31.1 grams of the product, 1-methyl-3-(tetrahydro-2-pyranyl)-6-methylthio-s-triazine-2,4(1H,3H)dione, m.p. 134°–135°C.

EXAMPLE 3

1-methyl-3-(tetrahydro-2-pyranyl)-6-methylamino-s-triazine-2,4(1H,3H)dione

The 6-methylthiotriazinedione from Example 2 (2.0 grams) dissolved in 20 ml of methanol was treated with wherein $R_1$ and $R_2$ are as previously defined.

The s-triazine-4-thio-2,4(1H,3H)dione, 14, can be prepared by heating the corresponding oxygen analogs, 11, with phosphorus pentasulfide at about 25° to 150°C. for about 1 to 12 hours in a solvent such as pyridine or picoline. The product can be isolated by dilution of the reaction mixture with a suitable hydrocarbon solvent (such as toluene), separating the solids (e.g., by filtration), and further extraction of the solids with the hydrocarbon solvent, followed by crystallization of the product from the hydrocarbon solvent extracts; or the reaction mixture can be treated with water, and the product extracted and crystallized as above.

The following Example illustrates this procedure.

EXAMPLE 4

1-methyl-6-dimethylamino-3-(tetrahydro-2-pyranyl)-s-triazine-4-thio-2,4(1H,3H)dione A solution of 1.89 grams of 1-methyl-6-dimethylamino-3-(tetrahydro-2-pyranyl)-s-triazine-2,4(1H,3H)dione, produced as in Example 1, was treated with 0.33 grams of phosphorus pentasulfide and the mixture was refluxed for 24 hours under anhydrous conditions. The resultant solution was filtered while still hot and the excess solvent was removed in a rotary evaporator to give 0.9 grams of the solid product, 1-methyl-6-dimethylamino-3-(tetrahydro-2-pyranyl)-s-triazine-4-thio-2,4(1H,3H)dione, m.p. 145°–147°C.

FORMULATIONS OF THE COMPOUNDS

The formulations of the compounds of Formula I for use in this invention can be prepared in conventional ways. They include dusts, granules, pellets, solutions, suspensions, emulsions, wettable powders, emulsifiable concentrates, and the like. Many of these can be applied directly. Sprayable formulations can be extended in suitable media and used at spray volumes of from a few pints to several hundred gallons per acre. High strength compositions are primarily used as intermediates for further formulation. The formulations, broadly, contain about 1% to 99% by weight of active ingredient(s) and at least one of (a) about 0.1% to 20% surfactant(s) and (b) about 5% to 99% solid or liquid diluent(s). More specifically, they will contain these ingredients in the following approximate proportions.

|  | Active Ingredient | Diluent(s) | Surfactant(s) |
|---|---|---|---|
| Wettable Powders | 20–90 | 0–74 | 1–10 |
| Oil Suspensions Emulsions, Solutions (Including Emulsifiable Concentrates) | 5–50 | 40–95 | 0–10 |
| Aqueous Suspensions | 10–50 | 40–89 | 1–10 |
| Dusts | 1–25 | 70–99 | 0–5 |
| Granules and Pellets | 1–35 | 65–99 | 0–15 |
| High Strength Compositions | 90–99 | 0–10 | 0–2 |

Lower or high levels of active ingredient can, of course, be present depending on the intended use and the physical properties of the compound. Higher ratios of surfactant to active ingredient are sometimes desirable and are achieved by incorporation into the formulation or by tank mixing.

The compounds of Formula I can be combined with other herbicides and are particularly useful in combination with bromacil [3-(sec-butyl)-5-bromo-6-methyluracil], diuron[3-(3,4-dichlorophenyl)-1,1-dimethylurea], paraquat[1,1'dimethyl-4,4'-bipyridinum ion], m-(3,3-dimethylureido)-phenyl tert-butylcarbamate, 4-amino-6-tert-butyl-3-methylthio-as-triazin-5(4H)-one, and the s-triazines such as 2-chloro-4-ethylamino-6-isopropylamino-s-triazine, for controlling a broad spectrum of weeds.

Some of the compounds of this invention possess unusually high water-solubility, up to several percent. This offers an advantage in, for instance, control of brush and other deep-rooted, perennial weeds. An example of a water-soluble compound of this invention is 1-methyl-3-(tetrahydro-2-pyranyl)-6-dimethylamino-s-triazine-2,4(1H,3H)dione.

Typical solid diluents are described in Watkins et al. "Handbook of Insecticide Dust Diluents and Carrier", 2nd Edition, Dorland Books, Caldwell, New Jersey. The more absorptive diluents are preferred for wettable powders and the denser ones for dusts. Typical liquid diluents and solvents are described in Marsden "Solvents Guide", 2nd Edition, Interscience, New York, 1950. Solubility under 0.1% is preferred for suspension concentrates; solution concentrates are preferably stable against phase separation at 0°C. "McCutcheon's Detergents and Emulsifiers Annual" Allured Publishing Corporation, Ridgewood, N.J., as well as Sisely and Wood "Encyclopedia of Surface-Active Agents", Chemical Publishing Co., New York, 1964, lists surfactants and recommended uses. All formulations can contain minor amounts of additives to reduce foam, caking, corrosion, microbiological growth, etc. Preferably, ingredients should be approved by the U.S. Environmental Protection Agency for the use intended.

The methods of making such compositions are well known. Solutions are prepared by simply mixing the ingredients. Fine solid compositions are made by blending and usually grinding as in a hammer or fluid energy mill. Suspensions are prepared by wet milling (see, for example, Littler U.S. Pat. No. 3,060,084). Granules and pellets can be made by spraying the active material upon preformed granule carriers or by agglomeration techniques (see J. E. Browning "Agglomeration", *Chemical Engineering*, Dec. 4, 1967, pages 147 ff. and "Perry's Chemical Engineer's Handbook", 4th Edition, McGraw-Hill, New York, 1963, pages 8–59 ff.

For further information regarding the art of formulation see, for example:

H. M. Loux, U.S. Pat. No. 3,235,381, Feb. 15, 1966 Column 6, line 16 through column 7, line 19, and examples 10–41.

R. W. Luckenbaugh, U.S. Pat. No. 3,309,192, Mar. 14, 1967, Column 5, line 43 through column 7, line 62, and examples 8, 12, 15, 39, 41, 52, 53, 58, 132, 138-140, 162-164, 166, 167, and 169–182.

H. Gysin and E. Knusli, U.S. Pat. No. 2,891,855, June 23, 1959, Column 3, line 66 through column 5, line 17 and examples 1 through 4.

G. C. Klingman, "Weed Control as a Science", John Wiley & Sons, Inc., New York, 1961, pages 81 through 96.

J. D. Fryer and S. A. Evans, "Weed Control Handbook", 5th Edition, Blackwell Scientific Publications, Oxford, 1968, pages 101–103.

Typical formulations are shown in the following examples. All percentages are by weight.

EXAMPLE A

Solution

| | |
|---|---|
| 1-methyl-6-dimethylamino-3-(tetrahydro-2-pyranyl)-s-triazine-2,4(1H,3H)dione | 37% |
| ethylene glycol monobutyl ether | 35% |
| methanol | 9% |
| water | 19% |

The ingredients are combined and stirred to produce a solution which can be extended with water for spraying.

EXAMPLE B

Wettable Powder

| | |
|---|---|
| 1-methyl-6-dimethylamino-3-(tetrahydro-2-pyranyl)-s-triazine-2,4-(1H,3H)dione | 25% |
| diatomaceous earth | 71.5% |
| dioctyl sodium sulfosuccinate | 1.5% |
| low viscosity methylcellulose | 2% |

The ingredients are thoroughly blended and passed through a hammer mill to produce particles mostly all below 100 microns.

USE OF THE INVENTION

The compounds of this invention are useful as herbicides in the control of undesirable vegetation. The compounds can be applied both pre-emergence and postemergence. Application rates range from one-half to 50 kilograms per hectare. Method and rate of application depend on such factors as soil type, climatic conditions, and weed population. Uniform distribution of the compounds is important, particularly in post-emergence treatment.

The herbicidal activity of compounds of this invention was discovered in greenhouse tests. In one test seeds of crabgrass (Digitaria spp.), barnyardgrass (*Echinochloa crusgalli*), wild oats (*Avena fatua*), Cassia tora, morningglory (Iponoea spp.), cocklebur (Xanthium spp.), sorghum, and nutsedge tubers were planted in a growth medium and treated pre-emergence with the chemical dissolved in a nonphytotoxic solvent. At the same time crabgrass with two leaves, barnyardgrass with two leaves, wild oats with one leaf, Cassia with three leaves (including cotyledonary ones), morningglory with four leaves (including the cotyledonary ones), cocklebur with four leaves (including the cotyledonary ones), sorghum with three leaves, and nutsedge with 3–5 leaves were sprayed. Treated plants and control were maintained in a greenhouse for 16 days, then all species were compared to control and visually rated for response to treatment. A qualitative (type of plant response) rating was made. The letter "C" indicates chlorosis; the letter "G" indicates growth retardation. A quantitative rating on a scale of 0–10 was also made; a rating of 0 means no effect; a rating of 10 means maximum effect, for example, complete kill in the case of chlorosis. Results obtained in this test for three of the compounds of this invention are given in the following table.

In another test two plastic bulb pans were filled with fertilized and limed Fallsington sandy loam soil. One pan was planted with sorghum and several grassy weeds. The other pan was planted with purple nutsedge (*Cyperus rotundus*), and several broadleaf weeds. The following grassy and broadleaf weeds were planted: crabgrass (*Digitaria sanguinalis*) barnyardgrass (*Echinochloa crusgalli*), wild oats (*Avena fatua*), johnsongrass (*Sorghum halepense*), dallisgrass (*Paspalum dilitatum*), giant foxtail (*Setaria faberii*), witchgrass (*Panicum capillare*), ripgut (*Bromus rigidus*), goosegrass (*Eleusine indica*), mustard (*Brassica arvensis*), dock (*Rumex crispus*), pigweed (*Amaranthus retroflexus*), curly indigo (*Aeschynomene virginica*), morningglory (*Ipomoea hederacea*), yellow rocket (*Barbarea vulgaris*), teaweed (*Sida spinosa*), velvetleaf (*Abutilon theophrasti*), and jimsonweed (*Datura stramonium*).

The above containers were treated pre-emergence (compound sprayed on soil surface before seed germination).

Ratings for compound tested are recorded in the following table. C = chlorosis/necrosis; G = growth retardation.

| Compound | rate (kg/ha) | Post-Emergence | | | | | | | Pre-Emergence | | | | | | |
|---|---|---|---|---|---|---|---|---|---|---|---|---|---|---|---|
| | | A | B | C | D | E | F | G | H | I | J | K | L | M | N |
| 1-methyl-6-dimethyl-amino-3-(tetrahydro-2-pyranyl)-s-triazine-4-thio-2,4(1H,3H)dione | 2/5 | 10C | 9C | 10C | 1C | 7C | 2C | 4C | 10C | 9C | 10C | 0 | 9C | 8C | 9C |
| 1-methyl-6-dimethyl-amino-3-(tetrahydro-2-pyranyl)-s-triazine-2,4(1H,3H)dione | 2/5 | — | — | — | 7C | 9C | 10C | — | 10C | — | 10C | 0 | 9C | 10C | 7C |
| 1-methyl-6-methylamino-3-(tetrahydro-2-pyranyl)-s-triazine-2,4(1H,3H)dione | 2/5 | — | — | — | 0 | 3C | 3C | 2C | 7C | 3C | 5C | 0 | 0 | 0 | 0 |

A and H - Morningglory
B and I - Cocklebur
C and J - Cassia
D and K - Nutsedge
E and L - Crabgrass
F and M - Barnyardgrass
G and K - Wild Oats

Pre-Emergence Soil-Surface Application

| Compound | rate (lb/A) | days after treatment | A | B | C | D | E | F | G | H | I | J | K | L | M | N | O | P | Q | R | S |
|---|---|---|---|---|---|---|---|---|---|---|---|---|---|---|---|---|---|---|---|---|---|
| methylamino-3-(tetrahydro-2-pyranyl)-s-triazine-2,4-(1H,3H)dione | ⅛ | 29 | 9C | 3C | 8C | 0 | 0 | 0 | 3C | 8C | 6C | 10C | 2C | 10C | 0 | 10C | 9C | 4C | 2C | 3C | 7C |
| | ¼ | 29 | 10C | 7C | 10C | 3G | 0 | 2G | 9C | 9C | 8C | 10C | 10C | 10C | 0 | 10C | 10C | 7C | 10C | 10C | 9C |

A - Crabgrass
B - Barnyardgrass
C - Wild Oats
D - Johnsongrass
E - Dallisgrass
F - Giant Foxtail
G - Kentucky Bluegrass
H - Ripgut
I - Goosegrass
J - Mustard
K - Dock
L - Pigweed
M - Nutsedge
N - Curly Indigo
O - Morningglory
P - Yellow Rocket
Q - Teaweed
R - Velvetleaf
S - Jimsonweed

What is claimed is:
1. A compound of the formula:
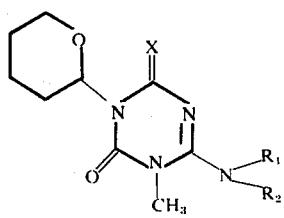
wherein
X is oxygen or sulfur;
$R_1$ is hydrogen or methyl; and
$R_2$ is methyl.
2. A compound of claim 1 wherein
X is oxygen or sulfur; and
$R_1$ and $R_2$ are methyl.
3. The compound of claim 2 which is: 1-methyl-6-dimethylamino-3-(tetrahydro-2-pyranyl)-s-triazine-2,4(1H,3H)dione.
* * * * *